United States Patent
Ghadar

(10) Patent No.: US 11,238,070 B1
(45) Date of Patent: Feb. 1, 2022

(54) DENSE CLUSTER FILTERING

(71) Applicant: A9.com, Inc., Palo Alto, CA (US)

(72) Inventor: Shabnam Ghadar, Sunnyvale, CA (US)

(73) Assignee: A9.COM, INC., Palo Alto, CA (US)

( * ) Notice: Subject to any disclaimer, the term of this patent is extended or adjusted under 35 U.S.C. 154(b) by 379 days.

(21) Appl. No.: 16/037,950

(22) Filed: Jul. 17, 2018

(51) Int. Cl.
*G06F 16/00* (2019.01)
*G06F 16/28* (2019.01)
*G06F 16/26* (2019.01)
*G06F 16/56* (2019.01)
*G06F 16/583* (2019.01)

(52) U.S. Cl.
CPC ............ *G06F 16/287* (2019.01); *G06F 16/26* (2019.01); *G06F 16/56* (2019.01); *G06F 16/5838* (2019.01)

(58) Field of Classification Search
None
See application file for complete search history.

(56) References Cited

U.S. PATENT DOCUMENTS

| | | | |
|---|---|---|---|
| 10,025,950 B1 * | 7/2018 | Avasarala | G06K 9/6223 |
| 10,242,265 B2 * | 3/2019 | Pachauri | G06K 9/00288 |
| 2011/0299770 A1 * | 12/2011 | Vaddadi | G06K 9/6211 |
| | | | 382/165 |
| 2014/0354768 A1 * | 12/2014 | Mei | H04N 5/23222 |
| | | | 348/36 |
| 2015/0169740 A1 * | 6/2015 | Gunderson | G06F 16/27 |
| | | | 707/749 |
| 2017/0083791 A1 * | 3/2017 | Shiratani | G06K 9/00624 |
| 2018/0255084 A1 * | 9/2018 | Kotinas | G06K 9/6218 |
| 2019/0005324 A1 * | 1/2019 | Anisimovskiy | G06K 9/6218 |
| 2019/0279346 A1 * | 9/2019 | Zhang | G06T 7/33 |

OTHER PUBLICATIONS https://www.ethz.ch/conterit/dam/ethz/spedal-interest/gess/computational-social-sciencedam/documents/education/Spring2015/datascience/clustering2.pdf.
https://www.cs.cmu.edu/~yaser/ModeSeekingByMedoidShifts_SheikhKhanKanade2007.pdf.
https://www.cs.helsinki.fi/u/ahyvarin/papers/Sasaki14ECML.pdf.

* cited by examiner

*Primary Examiner* — Debbie M Le
(74) *Attorney, Agent, or Firm* — Hogan Lovells US LLP

(57) ABSTRACT

Systems and methods are described for determining clusters for large collections of content items. A fast cluster-identifying algorithm can be used to find high density areas where certain less interesting content items might be clustered in a feature space. An example algorithm is a mean shift algorithm. Once these high-density clusters are located, a system can remove them and proceed to analyze the remaining data. Removing these clusters of featureless content items can greatly reduce the collection size and also enhance the overall quality of the collection. Labels can then be applied to clusters and, when a content item is received, classification algorithms can be used to assign an appropriate label to the content item.

20 Claims, 9 Drawing Sheets

DENSE CLUSTER FILTERING

BACKGROUND

As the costs of data storage and transmission have gone down, users and systems now generate vast quantities of data. This data can be useful in various artificial intelligence applications. For example, a system can translate text from one language to another, identify subjects in an image, find relevant web sites for a query, predict the weather, etc. However, the accuracy of these artificial intelligence applications is typically limited by the complexity and cost of processing the data, such complexity and cost can exponentially grow with larger datasets.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Systems and methods in accordance with various embodiments of the present disclosure may overcome one or more of the aforementioned and other deficiencies experienced in conventional approaches to determining clusters for large collections of content items. Many clustering algorithms are computationally expensive, for example Hierarchical Density Based Spatial Clustering of Applications with Noise (HDBSCAN) is a $O(n^2)$ operation. For many large collections of content items, certain clusters of uninteresting content items may exist. For example, in a collection of images, many of those images might be underexposed and generally featureless. A fast cluster-identifying algorithm can be used to find high density areas where such content items might be clustered in a feature space. An example algorithm is a mean shift algorithm. Once these high-density clusters are located, the system can remove them and proceed to analyze the remaining data. Removing these clusters of featureless content items can greatly reduce the collection size and also enhance the overall quality of the collection. Labels can then be applied to clusters and, when a content item is received, classification algorithms can be used to assign an appropriate label to the content item.

Various other functions and advantages are described and suggested below as may be provided in accordance with the various embodiments.

Figure 1:
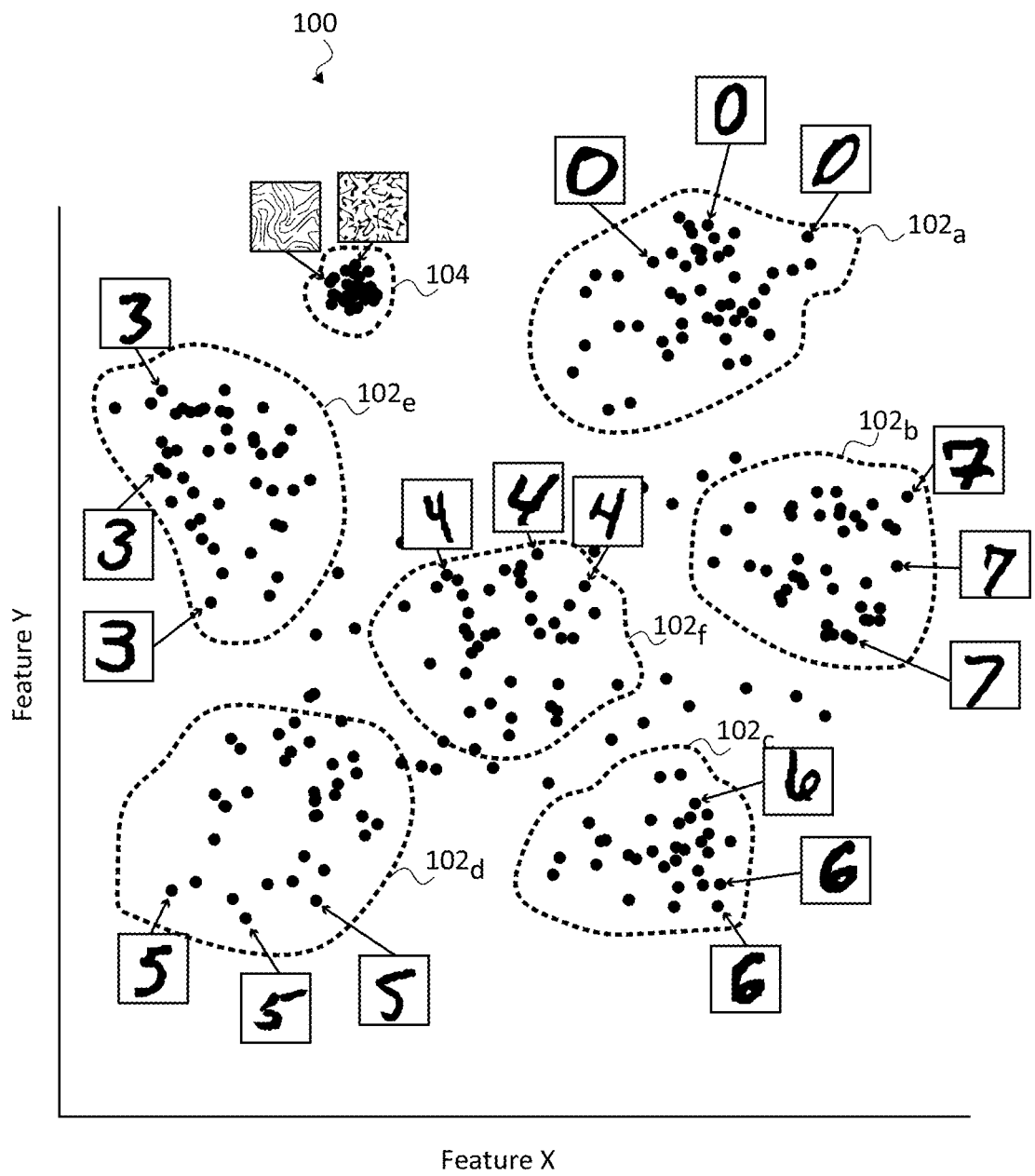
FIG. 1 illustrates an example representation of various images in a feature space according to some embodiments.

FIG. 1 illustrates an example representation 100 of various images in a feature space according to some embodiments. Many images in example representation 100 are taken from the Modified National Institute of Standards and Technology (MNIST) database representing handwritten digits while other images are of non-digits. A system can be utilized to automatically identify features for the images and identify clusters of images based on their respective features. Example representation 100 can depict a feature space comprising two features X and Y and a plotting of feature vectors for images. For example, an image with a low score for feature X and a low score for feature Y will be plotted in the bottom-left of example representation 100. Images having similar features will generally form clusters 102. Once clusters are established, labels can be applied to the clusters 102. For example, a human operator can batch-label images found in cluster $102_a$ as "0," images found in cluster $102_b$ as "7," etc. With smaller datasets, a clustering algorithm can be chosen based on the quality of results it produces regardless of computational complexity. However, when the dataset (i.e., the number of images) increases to millions of data points, the higher quality clustering algorithms might be unable to identify clusters within an allotted time or cost constraint. If the dataset is even larger, no clustering algorithm can compute clusters within given cost constraints.

In order to shrink the size of the dataset, a preliminary filter can be used to identify and remove images that are uninteresting. For example, in example representation 100, various images of pure noise, simple textures, or featureless images can be uninteresting. These uninteresting images tend to form dense clusters such as cluster 104. A fast (i.e., computationally simple) clustering algorithm can be used to identify these dense clusters and they can be automatically removed from the dataset in preparation for a more rigorous clustering algorithm to identify clusters of interest. Uninteresting images might also not fit into any cluster and might be a distance away from any nearest neighbor. These outlier images can also be removed from the dataset as uninteresting.

Once clusters are established in the feature space, when a new image is received it can be quickly labelled by determining to which cluster it belongs. For example, a k-nearest neighbor algorithm can be used to assign a label to the new image.

The content items of the dataset can be images. Clustering can be used to determine what the image represents. For example, in example representation 100, the images depict handwritten numbers and the clusters can be used to label the images with the numbers depicted. Similarly, images of places, people, products, logos, objects, etc. can be clustered accordingly. The content items can be audio clips and can be clustered according to specific phonemes, words, parts of speech, sentence type, language, etc. The content items can be songs and the clustering can assign a genre, a theme, etc. The content items can be video clips such as user-generated content, television shows, or movies. The content items can correspond to user behaviors such as activity on an online marketplace (e.g., browsing flow in the marketplace). The content items can be sub-items of other items. For example, a face-detection algorithm can generate sub-images of faces that are components of images of people; the clustering algorithm can then cluster each face sub-image with similar sub-images taken from other images.

Figure 2A:
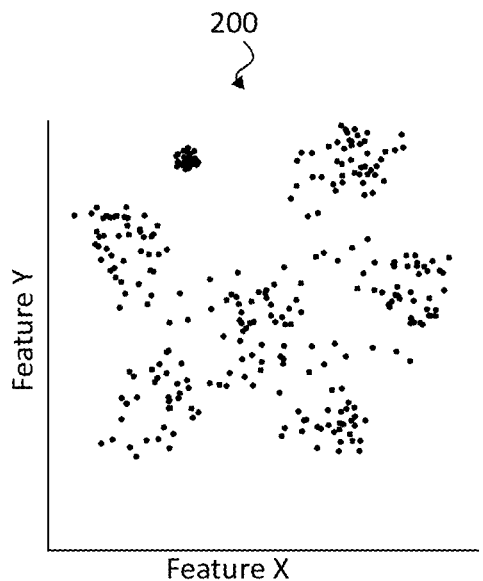
FIGS. 2A-2E illustrate techniques for identifying and removing high-density clusters in a dataset.

FIGS. 2A-2E depict techniques for identifying and removing high-density clusters in a dataset. In FIG. 2A, a collection of data is represented in a 2-dimensional feature space 200. The collection of data can be a collection of content items such as images, audio, video, text, or other data. The data can be pre-processed to assign a feature vector to the data, the feature vector can be determined using a machine learning technique such as a neural network. An autoencoder can be used to identify the feature vector. The features of the feature vector can be generally unrecognizable or unintelligible to humans. In some embodiments, the features can represent a human-recognizable feature such as the length of lines in an image, a frequency power in an audio sample, etc. While two dimensions are represented in feature space 200, greater or fewer features can be utilized. For example, a single-dimensional feature vector can be determined for each data point or an n-dimensional (e.g., 10,000 dimensions) feature vector can be utilized.

In some embodiments, a dimensionality reduction algorithm can be employed which reduces the dimensionality of the system. For example, if an initial algorithm generates a 10,000-dimension feature vector, the dimensionality reduction algorithm can transform the generated vector into a 100-dimension feature vector. This can greatly simplify the feature space and make clustering more efficient and create better quality results. The dimensionality reduction algorithm can utilize feature selection that eliminates dimensions that are less useful for classification. The dimensionality reduction algorithm can utilize feature extraction to combine multiple features into single features. For example, 1,000 features can be used to determine 1 feature, another 1,000 features can be used to determine a second feature, etc. A combination of feature selection and feature extraction can be used. Various algorithms can be utilized to decrease the dimensionality of the data such as principle component analysis (PCA), linear discriminant analysis (LDA), canonical correlation analysis (CCA), non-negative matrix factorization (NMF), k-nearest neighbors (K-NN), large-margin nearest neighbor (LMNN), etc.

In some embodiments, an algorithm as described above for dimensionality reduction can be utilized to transform the feature vector even if the dimensionality is not reduced. For example, a large-margin nearest neighbor algorithm can be utilized to transform a feature vector into another feature vector with a same or greater number of features. Transformation and dimensionality-reduction algorithms can be optimized to bring vectors closer together in a feature space. For example, such algorithms can transform the data into more meaningful representations for clustering algorithms.

Other distance learning algorithms can be utilized for dimensionality reduction and/or feature transformation. Examples include proxy-based distance metric learning (arXiv:1703.07464 [cs.CV]), Dimensionality Reduction by Learning an Invariant Mapping (Raia Hadsell, Sumit Chopra, Yann LeCun, yann.lecun.com/exdb/publis/pdf/hadsell-chopra-lecun-06.pdf), distance metric learning with magnet loss (arXiv:1511.05939 [stat.ML]), and others.

Figure 2B:
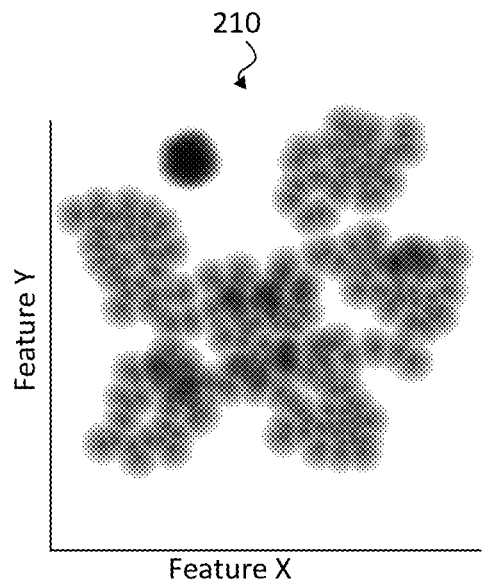

FIG. 2B represents an example density representation 210 of the data from FIG. 2A. For example, the more dense areas are darker while the less dense areas a lighter. Density can be a representation of how many data points can be located within a range of features. High density can occur if one, multiple, or all feature dimensions have a large number of data points within a range. As discussed previously, certain high-density regions may be indicative of uninteresting data points while sparse regions can also be indicative of uninteresting data points. It should be understood that "uninteresting" can also mean that the data points are computationally difficult to classify or cluster with a predetermined amount of required certainty.

Figure 2C:
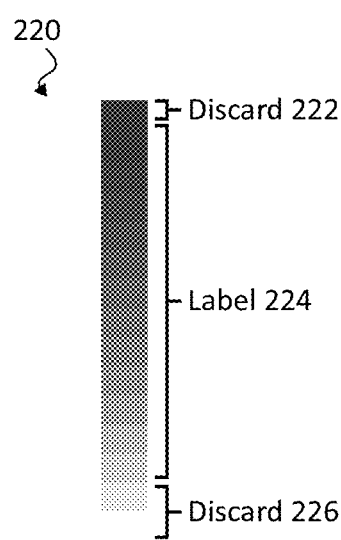

FIG. 2C represents an example density exclusion key 220 representing which densities to keep and which to discard. For example, the darker shade 222 symbolizing very dense regions and the lighter shade 226 symbolizing less dense regions can be discarded. The intermediate shades 224 symbolizing moderately dense regions can be retained for clustering and further analysis.

Returning to FIG. 2B, a system can determine regions of high density through various clustering means. For example, a mean shift algorithm can be a fast and simple technique for finding regions of high density. A mean shift algorithm uses a moving window (e.g., a circle) and calculates the mean (e.g., centroid) of the data points within the window, the window will then move so that the mean is the new center of the window. After moving, a new mean is calculated, presumably with new data points entering the window and some data points leaving the window, and the window is shifted again. After a predetermined number of iterations or until stability is achieved, the system can determine that the data points within the window are a high-density cluster and can be removed. In some embodiments, the mean shift algorithm can be used to identify loci of high density regions while another technique can be used to refine the cluster by adding and/or removing data points from the original defined cluster. In some embodiments, a window size (e.g., a width or diameter of the window) can be predetermined. The window size can be different for each dimension. For example, if the system has an X dimension corresponding to an X feature and a Y dimension corresponding to a Y feature, then the window size can be 0.3 X units and 15 Y units. In some embodiments, the window size (e.g., for each dimension) can be calculated based on the distribution of data for a dimension. For example, the window size can be m times the standard deviation for the dimension. In some embodiments, a system can automatically adjust the window size until the results reach a satisfactory outcome. For example, the window size can start off large and gradually decrease until the data points contained within the window have a specified distribution. In some embodiments, the mean shift function can begin with a large window size but only a sub-sample of the data set. As the window moves, the window size can decrease while adding more random data points from the data set.

In some embodiments, the feature space (e.g., the n-dimensional space whereby the data points can be located) is non-Euclidian. The warping and other transformations inherent in the geometry of the feature space can be applied to the mean shift window. This can cause that a circular window might transform and distort as it moves through the feature space.

The technique that identifies a high density region likely will identify local maxima that do not necessarily have sufficient density to warrant removal from the dataset. After an algorithm determines a local maximum (e.g., the mean shift algorithm settles on a region), a system can calculate whether the region has sufficiently high density to justify removal. For example, the system can count the number of data points defined in the region and if a sufficiently large number are identified, they can be marked for removal. In some embodiments, the density required for removal can be dependent on the total size of the dataset. For example, if a predetermined percentage of data points of the dataset fall within the region, they can be marked for removal.

In some embodiments, multiple starting points can be utilized to identify local maxima of higher density regions. For example, each dimension can be divided into a predetermined number of starting points. The starting points can be weighted towards an estimated overall mean of the dataset. If there are 3 starting points per dimensions, then a 4 dimensional feature space will have 81 starting points in the feature space. In some embodiments, certain dimensions or features are determined to be more relevant than others, meaning analyzing the information in that feature is more instructive to clustering than other dimensions. In these dimensions, a greater number of starting points can be used.

In some embodiments, earlier iterations of the mean shift algorithm can "move" the window intelligently to more quickly arrive at a stable outcome. For example, For initial iterations, the window can have a momentum value that results in the resulting center overshooting the calculated mean by a predetermined percentage. For example, if the movement is large, then the overshooting can be large as well. A smoothing function can be applied to the path that the window takes to prevent jitters from causing it to move erratically.

Other techniques for identifying high density regions can be utilized. For example, a heat map (or n-dimensional volume) similar to representation 210 of FIG. 2B can be generated. In the two-dimensional analogy presented in FIG. 2B, each data point can be rendered in the feature space as a circle with a dark center and a lighter periphery. As the data points are rendered, the dark regions can combine to form even darker regions. The "pixels" of the resulting heat map can represent the density of the feature space at that region. The data points in the higher density regions can be marked for omission. In some embodiments, an initial heat map can be generated using a subset of the data set. Regions that are denser then others can then be further defined using progressively larger subsets of data that reside within those regions.

Figure 2D:
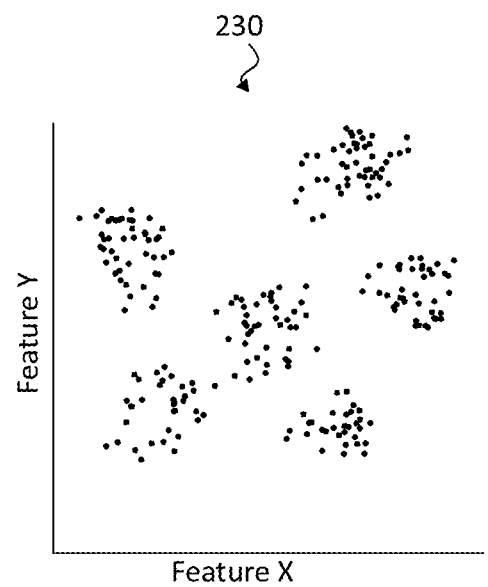

FIG. 2D represents an example feature space 230 after the high density region has been removed. In some embodiments, low density regions can also be removed. For example, a system can identify data points that are a predetermined distance away from a nearest neighbor. This distance can pertain to a single feature, multiple features, or every feature.

Figure 2E:
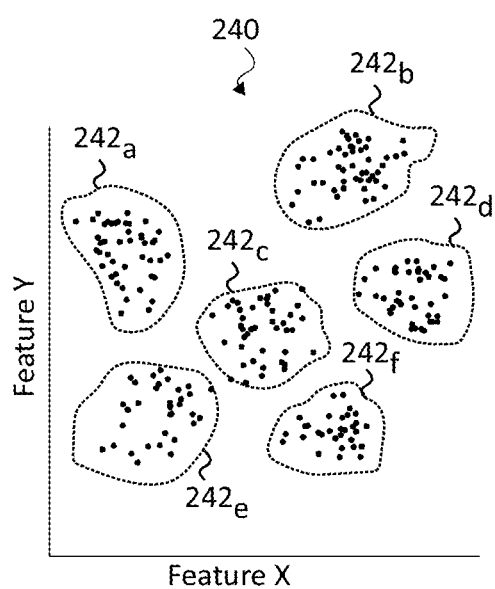

FIG. 2E represents an example feature space 240 after a cluster analysis has been performed. Various regions $242_a$-$242_f$ can represent regions of the feature space that are determined to correspond to different clusters. In some embodiments, a cluster can be defined by the region of space (e.g., represented by the regions 242). In some embodiments, a cluster can be defined by a collection of data points that share a label. For example, when a new content item is received, its feature vector can be determined and it can be assigned a label based on predefined clusters. If the cluster is based on a region, the system can determine whether the new content item falls within the region. If the cluster is defined by a collection of data points, a k-nearest neighbors approach can assign a cluster/label based on the nearby data points.

In some embodiments, a polygonal representation of a cluster can be generated. For example, using a two-dimensional analogy, a pentagon can be created that circumscribes the cluster. In higher order dimensions, higher order polygons can be utilized to tightly surround the data points of the cluster. When a new data point is received, it can be quickly classified by determining whether it fits within one of the cluster polygons.

Figure 3:
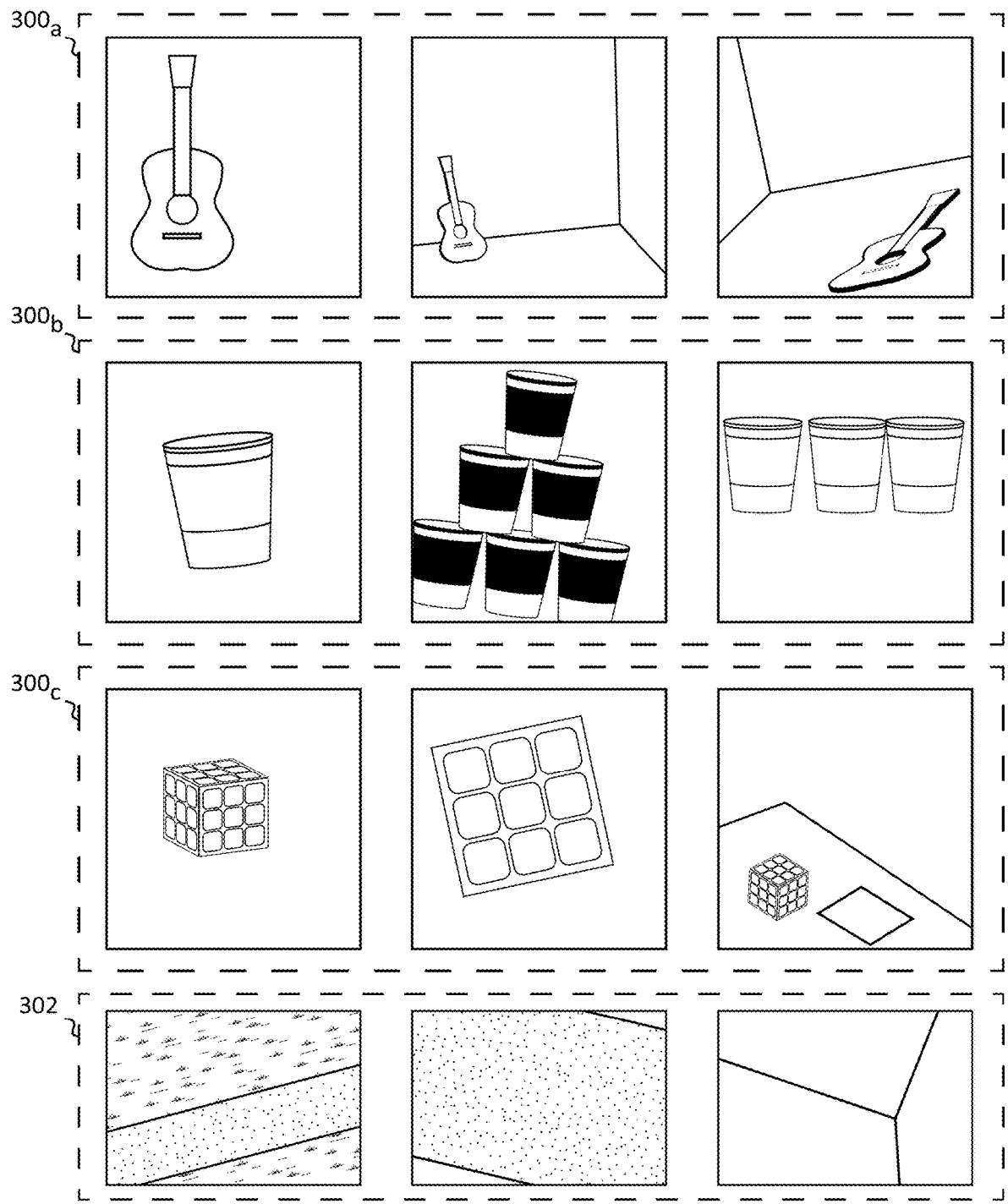
FIG. 3 represents example clusters that can be isolated using various techniques.

FIG. 3 represents example clusters $300_a$-$300_c$ that can be isolated using the techniques described herein. For example, images taken in the depicted clusters can be image queries. Such image queries can be utilized by users when the user wants to know more information about a certain item or wishes to identify an item. For example, a user can take an image with a portable electronic device (e.g., a cell phone, smart watch, table, laptop, application-specific device, etc.). The image can then be preprocessed on the device. Such preprocessing can include downsampling, reducing color depth, compression, etc. Preprocessing can also include some feature detection to determine characteristics of the image (e.g., using edge detection, corner detection, region of interest detection, ridge detection, etc.). Preprocessing can include performing a high-pass filter on the image. In some embodiments, the image includes depth data. Depth data can be determined algorithmically from two pictures taken at two locations of the same object (e.g., a dual-camera phone or taking a first image and moving the camera for a second image). Depth data can be determined using a depth sensor such as an infrared camera system. In some embodiments, text in the image can be detected.

The portable electronic device can then send the image to a system for labelling. For example, a system can be trained on a large data set of images for defining clusters as described herein. The system can then assign a label to the new image based on it matching a cluster. The system can then communicate the label to the portable electronic device for presentation to the user. In some embodiments, the label can include a reference to a shopping product.

As previously described, not all images contain interesting objects. The group of images 302 can be unimportant images that do not have an object of interest. These images might be accidental images, blurry images, images of floors, ceilings, pure textures, corrupted images, etc. These images might naturally form dense clusters in the feature space and, using the techniques described herein, they can be removed automatically. A system can determine that the images form a dense cluster and remove those images without human intervention. Alternatively, the system can suggest that the images are candidates for removal and an operator can select an option to remove those images from further processing. In certain data sets, these uninteresting images might account for a significant percentage of the sample; removing these images can greatly reduce processing time when a thorough cluster analysis is performed.

Figure 4:
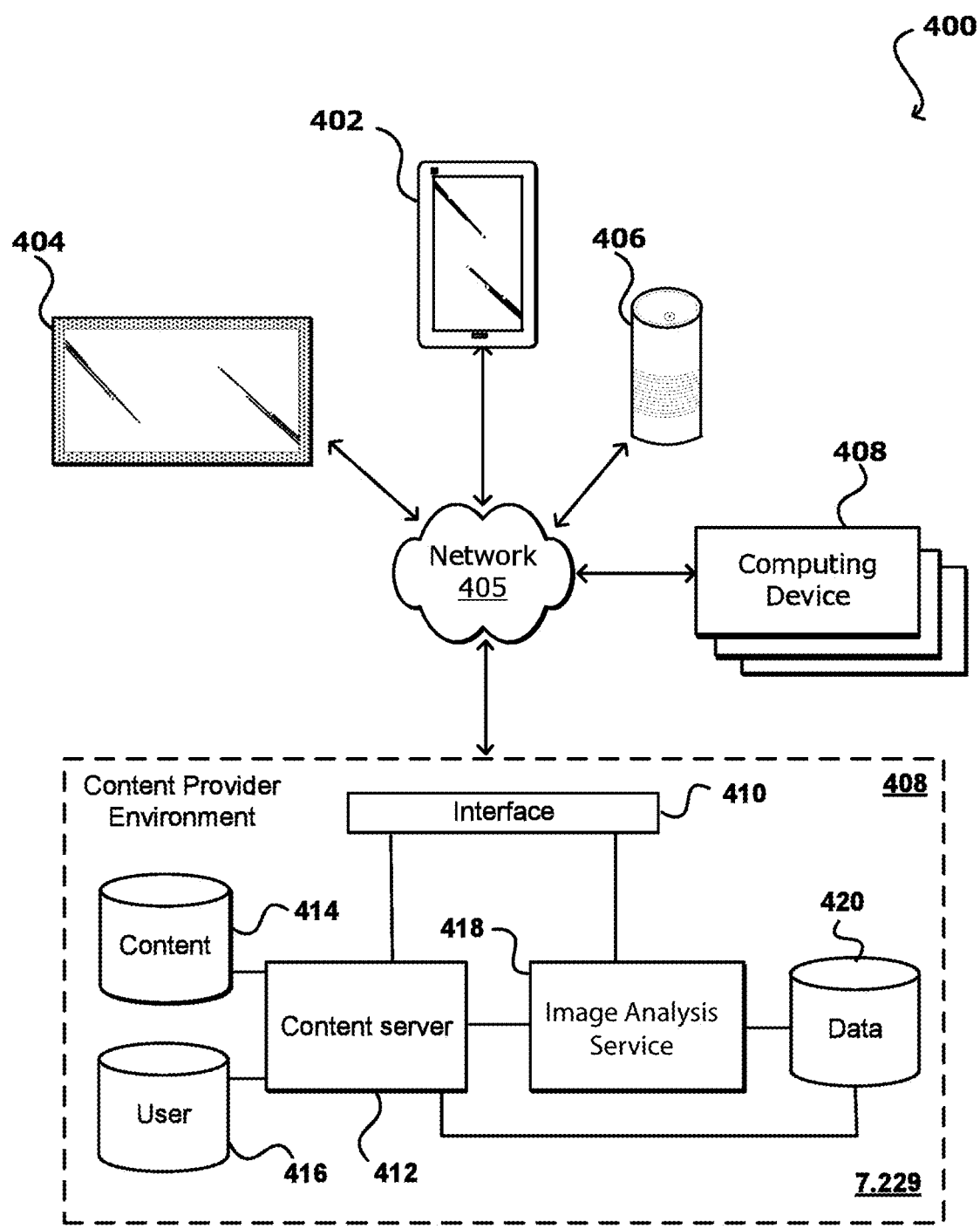
FIG. 4 illustrates an example environment that can be used to implement aspects in accordance with various embodiments.

FIG. 4 illustrates an example of an environment 400 that can be used to implement aspects in accordance with various embodiments. As described, various embodiments enable content to be presented on secondary computing devices remote a primary computing device. The secondary computing devices may be remote from and not tangibly connected with the primary computing device. In some embodiments, the primary and secondary computing devices may be tangible connected. In FIG. 4, client computing device 402 can represent the primary computing device and the secondary computing devices can include display device 404, active listening device 406, and computing devices 408 that can represent anyone of a number of devices. The primary computing device can communicate directly with one or more of the secondary computing devices. For example, devices can communicate one another using any communication protocol known in the art such as, but not limited to, BLUETOOTH®, Wi-Fi and radio frequency.

Additional or alternatively, the devices can communicate through a resource provider environment 408 across at least one network 405. The devices can also communicate with the resource provider environment for various other purposes as described herein.

In this example, a call received to the resource provider environment 408 for additional or supplemental content can be received by an interface layer 410 of the environment. As known for network environments, the interface layer can include components such as interfaces (e.g., APIs), load balancers, request and/or data routers, and the like. In this example the request includes a content item query such as an image query. The request can be directed to one or more content servers 412, which can obtain the content (e.g., primary content and/or secondary content) from a content data store 414 or other such repository to be sent back across the network(s) to an appropriate one of the devices (402, 404, 406, 408). In some embodiments, information for the request might also be compared against user data in a user data store 416 or other such location do determine, for example, whether the user has access rights to that content. In one example, the content can include various items to be displayed as part of a set of search results or set of potential items of interest to be viewed within the scene of the live view, although various other types of content and uses for images can be utilized as well within the scope of the various embodiments.

In some cases, a request received to the content provider environment 408 might be from another entity, such as one of the secondary computing devices As discussed elsewhere herein, additional or secondary computing devices can present secondary content to users as part of, or along with, the primary content. The interface layer can determine the type of request and cause information to be forwarded to content server 412 or image analysis service 418 or other such system or service. In various embodiments, the image analysis service can determine analyze the content item query to determine appropriate labels for the content item query. In some embodiments, the image analysis service can review many content items stored in database 420 to determine clusters as disclosed herein. Information for such information may be included in the request and/or obtained from user data store 416. In various embodiments, the devices can receive input to control the presentation of content. The input can be a touch-based input, a gesture-based input (e.g., waving at the primary computing device), an audio-based input (e.g., utterance received by the primary computing device), a motion-based input (e.g., movement of the primary computing device), an image-based input, among other such inputs. The input can trigger a request for content, and the content server and/or the image analysis service can determine the appropriate content to be provided. Accordingly, a user can view and interact with presented content, and can maneuver through various content items using various approaches discussed and suggested herein.

Figure 5:
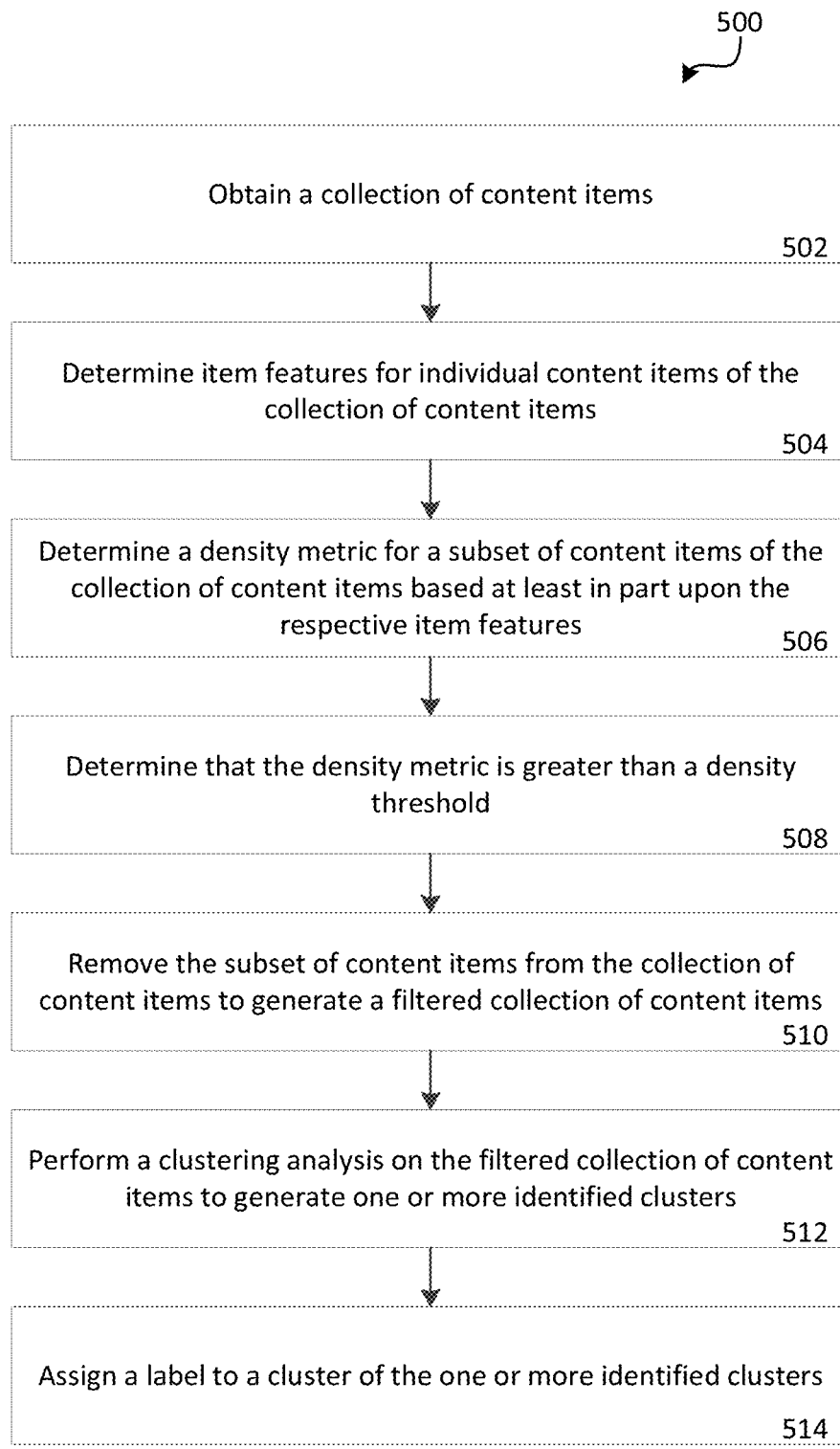
FIG. 5 illustrates an example method for identifying clusters and assigning labels to the identified clusters.

FIG. 5 illustrates an example method 500 for identifying clusters and assigning labels to the identified clusters. A system can obtain a collection of content items 502. A content item can be an image, a video, an audio segment, a song, a voice command, a collection of user activity, a product listing, a phoneme, word, sentence, paragraph, page of a book, etc. A content item can be a sub-part of another content item; for example, an image can contain multiple people in the image, the content item can be a sub-image depicting a single person. An image content item can be of a place, a product, an object, or a person (e.g., a person's face). In some embodiments, the collection of content items can include content items that were submitted by a user. Additionally or alternatively, the content items can be retrieved from a database. The content items can be classified and/or labelled to guide supervised learned or can be unclassified/labelled such that the machine learning is unsupervised.

In some embodiments, the content items in the collection can be preprocessed to conform to a standardized format. For example, an image content item can be resized to a standard size, the exposure, contrast, and coloring can be corrected and standardized. An audio segment can be processed using various audio processing techniques such as speech processing, Fourier transform, etc. In some embodiments, the content items can be translated. In some embodiments, the content item can be compressed.

The collection of content items can be a complete set of all available training content items. Alternatively, additional content items can be used for testing or other purposes. In some embodiments, example method 500 can be applied multiple times to different collections of content items. For example, a collection of animal images, a collection of product images, and a collection of celebrity images can all be processed according to example method 500 to discover clusters within the respective collections. A system can then pre-process an image to determine the type of collection that the image likely applies to. For example, if the image is of a person, it might belong to the celebrity collection whereas if the image includes a box-like object then it might belong to the product collection.

A system can determine item features for individual content items of the collection of content items 504. A machine learning algorithm can automatically determine features of the individual content items in an unsupervised manner. For example an image autoencoder can determine a feature vector that describes unique aspects of the image. Other techniques include edge detection, line detection, corner detection, image segmentation, image classification using convolutional neural networks, clustering, etc. The resulting features can be an n-dimensional vector of features. For example, one feature can be associated with how curvy an object is and can be between 0 and 1. Features need not be intelligible to humans. In some embodiments, a feedback system can be established to ensure that features are meaningful and useful. For example, if it turns out that one feature is seemingly random and/or has a small variance then it might be less useful in making determinations in later stages, such features can be discarded.

The initial feature vector dimensionality (i.e., how many dimensions or "features" comprise the vector) can be sufficiently large to encumber large-scale analysis of multiple items. A dimensionality reduction technique can be utilized to decrease the number of dimensions in the feature vector. For example, a k-nearest neighbor technique can reduce a large feature space to a significantly smaller one. Additionally, preprocessing steps can aid in this dimensionality reduction, such as principle component analysis. The resulting feature space can have a more manageable number of dimensions. One significant advantage of reducing the dimensionality of the feature space is that with feature spaces with very high dimensionality, the Euclidian distances between two data points becomes unmanageable. For example, if each dimension can be a value between 0 and 1, then for a high dimensional feature space (e.g., with 1,000 dimensions), the distance between any two points will likely be close to 1.

An automated system can determine an optimal number of dimensions to utilize. For example, the system can determine that an initial vector size does not give meaningful cluster results in later stages, whereas a larger vector size results in a feature space that is too sparse. The dimensionality can be adjusted up and down until an optimal number is determined. In some embodiments, such dimensionality testing can be performed on a subset of the data and once a number of dimensions (i.e., a feature space) is determined, the entire collection can be analyzed.

A system can determine a density metric for a subset of content items of the collection of content items based at least in part upon the respective item features 506. Content items that do not represent anything will typically cluster together in a dense cluster in the feature space. For example, if a bunch of images are largely underexposed, they will share many characteristics and features. Similarly, content items that lack definition, are out of focus, are uniform, etc. will likely cluster together. Because these content items will likely not be assignable to any label, it can be computationally efficient to remove them from the collection early on using a fast algorithm.

An example algorithm for determining a density metric for a subset of content items can be a mode seeking algorithm such as the mean shift algorithm. For example, a random location in the feature space can be decided and a predetermined window size can dictate the initial evaluation region for the algorithm. The system can determine every data point that resides within the evaluation region and calculate the mean (e.g., the "center of mass") for those data points. The window can then move so that its center is now the previously calculated mean. Some data points might now be in the new evaluation region while other data points might now be outside of the evaluation region. This process can continue until the window stabilizes and no longer moves. The process can continue for a certain number of iterations. The mean shift algorithm stabilizing can indicate that it has detected a local maximum for the feature space. It can then determine the density (e.g. a "density metric") at that local maximum by counting the number of data points (i.e., content items) are contained within the evaluation region defined by the window. The window need not be a constant size or shape. For example, a large window can initially be utilized and progressively smaller windows can then be used as the algorithm converges on a local maximum. The density metric can be based on the number of data points within the window as well as the window size (e.g., length, area, volume, etc.). In some embodiments, multiple data points can have identical feature vectors. This can be the result of duplicate or almost duplicate content items. For example, if an image is completely overexposed and is entirely white, it will likely have an identical feature vector as another similarly overexposed image. In some embodiments, the collection of content items can be "de-duplicated" by discarding duplicates.

Other mode seeking algorithms are contemplated such as Mode-seeking by Mediodshifts (Yaser Sheikh, Erum Khan, and Takeo Kanade, www.cs.cmu.edu/~yaser/ModeSeekingByMedoidShifts SheikhKhanKanade2007.pdf) and Mode Seeking by Direct Estimation of the Gradient of a Log-Density (Hiroaki Sasaki, Aapo Hyvarinen, and Masashi Sugiyama, www.cs.helsinki.fi/u/ahyvarin/papers/Sasaki14ECML.pdf).

A system can determine that the density metric is greater than a density threshold 508. The density threshold can be predefined. The density threshold can be dependent on the overall density of the feature space. For example, the density threshold can be 100 times the density of the feature space. In some embodiments, he density metric includes a variance metric and the variance is compared against a variance threshold.

The steps of determining a density metric for the subset of content items can be repeated for multiple local maxima. For example, a different starting location can result in the window converging on a different location. The content items that fall within the window when it converges can be counted to determine another density metric for these new content items. If it is greater than the threshold amount, they can be marked for removal. If the subset of content items does not have a density metric greater than the threshold amount, then they can be retained. The process can be repeated until starting seeds have resulted in maxima throughout the feature space. In some embodiments, gradient ascent trees can be created defining different paths that lead to different local maxima. From these gradient ascent trees, a system can determine a simplified topology for the feature space. While this simplified topology can be sufficient to discover the highly dense areas which are akin to mountains, other regions of moderate density akin to plateaus might not be fully discovered using this technique.

A system can remove the subset of content items from the collection of content items to generate a filtered collection of content items 510. If the collection of content items contains 10 million content items, the subset of content items might contain 5 million content items. These content items can be removed from the data set/collection and discarded. These discarded content items are likely the uninteresting content items such as pictures of floors or underexposed pictures.

A system can perform a clustering analysis on the filtered collection of content items to generate one or more identified clusters 512. Various cluster identification techniques can be used. In some embodiments, a k-means algorithm can represent a cluster by a single mean vector. A hierarchical clustering model can be utilized. A neural network can be used to identify clusters such as using principal component analysis or independent component analysis. In some embodiments Hierarchical Density Based Spatial Clustering of Applications with Noise (HDBSCAN) can be used and/or Density Based Spatial Clustering of Applications with Noise (DBSCAN). Other density-based clustering models are contemplated such as the one exemplified at www.ethz.ch/content/dam/ethz/special-interest/gess/computational-social-science-dam/documents/education/Spring2015/datascience/clustering2.pdf.

The clustering algorithm in step 512 can be computationally complex in comparison to the dense-region finding in steps 506 and 508. In some embodiments, the initial high-density removal process is performed using a first clustering algorithm while the final clustering determination is performed using a second clustering algorithm. The first clustering algorithm and the second clustering algorithm can be similar though the first can be simplified or less thorough in comparison to the second. For example, the first clustering algorithm can use a smaller data set to identify high density cluster regions (which can then be used to identify other content items that reside in the same regions).

To calculate clusters, a system can determine the distance of the k-nearest neighbor of content items in the feature space. The system can then determine the reachability-distance between two data points which is the distance between the points or the distance to the k-nearest neighbor, whichever is larger. The system can then build a minimum spanning tree from the reachability-distances by using Prim's algorithm. This minimum spanning tree can then be used to identify clusters. Clusters can be condensed based on a minimum cluster size. Other techniques can be utilized to complete the HDBSCAN procedure.

A system can assign a label to a cluster of the one or more clusters 514. Once clusters are identified, the system can determine a label to apply to each cluster. In some embodiments, an operator can review the clusters and determine an appropriate label. In some embodiments, the system can look for a common label shared by a majority of the content items (i.e., if some of them were provided with labels). A system can prompt a user to suggest a label for the cluster (e.g., the user can provide a label for an image submitted by the user and if a number of users agree on the proposed label, it can be assigned to the cluster).

Figure 6:
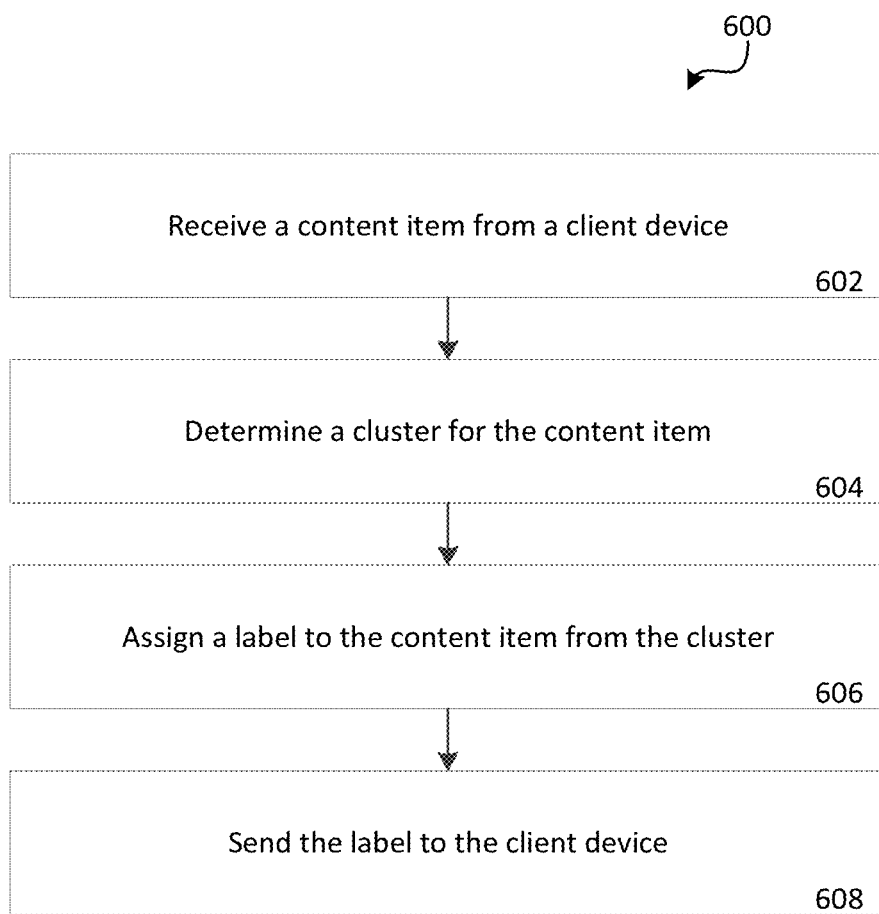
FIG. 6 illustrates an example method for assigning a label to a content item.

FIG. 6 illustrates an example method 600 for assigning a label to a content item. A system can receive a content item from a client device 602. The client device can record audio with a microphone, record images with a camera, record video using a camera and microphone, record other data, etc. The content item can include text (e.g., a text message or other text content item). The client device can be associated with a user. For example, the user can be logged in to a program associated with the system and the system can associate the client device with the user's account. The user can supply the content item as a query. For example, an image search, a product search, a voice search, a music search (e.g., to find a song in a similar genre). The client device can send the content item using the Internet, wireless communications, etc.

A system can determine a cluster for the content item 604. The system can employ various techniques to determine a cluster for the content item. For example, the system can use k-nearest neighbors to determine a cluster for the content item. In some embodiments, the system can use a support vector machine or other machine learning classification algorithm to determine an appropriate cluster for the content item.

A system can assign a label to the content item from the cluster 606. The system can use a classifier and the collection of content items that have been labelled using clustering techniques to assign a label to the content item. A system can send the label to the client device 608. For example the system can send the results of an image query to the client device.

Figure 7:
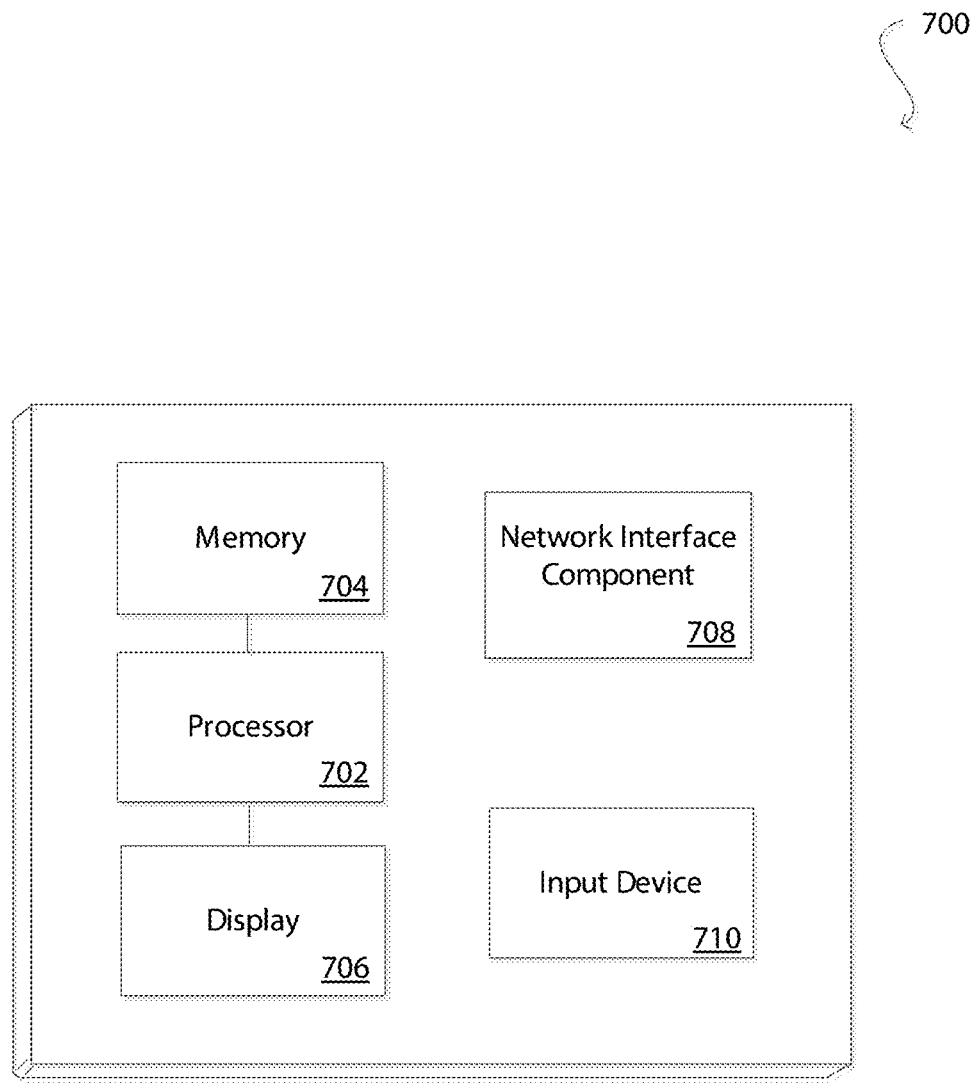
FIG. 7 illustrates example components of a computing device that can be utilized in accordance with various embodiments.

FIG. 7 illustrates a logical arrangement of a set of general components of an example computing device 700 that can be used to implement aspects of the various embodiments. In this example, the device includes a processor 802 for executing instructions that can be stored in a memory device or element 704. As would be apparent to one of ordinary skill in the art, the device can include many types of memory, data storage, or non-transitory computer-readable storage media, such as a first data storage for program instructions for execution by the processor 702, a separate storage for images or data, a removable memory for sharing information with other devices, etc. The device typically will include some type of display element 706, such as a touch screen or liquid crystal display (LCD), although devices such as portable media players might convey information via other means, such as through audio speakers. As discussed, the device in many embodiments will include at least one input element 710 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device. In some embodiments, the computing device 700 of FIG. 7 can include one or more network interface components 708 for communicating over various networks, such as a Wi-Fi, Bluetooth, RF, wired, or wireless communication systems. The device in many embodiments can communicate with a network, such as the Internet, and may be able to communicate with other such devices.

Figure 8:
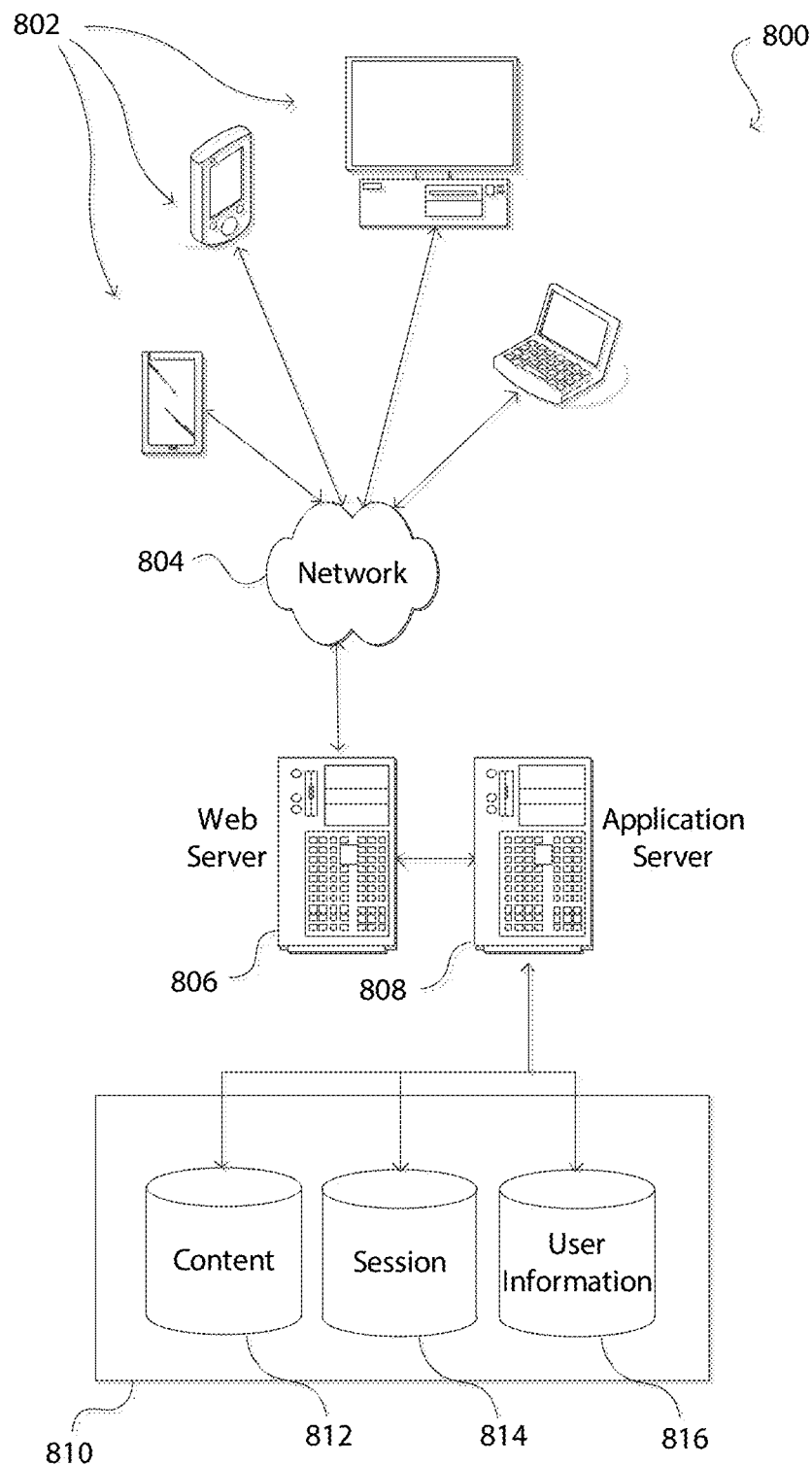
FIG. 8 illustrates an example environment in which aspects of the various embodiments can be implemented.

As discussed, different approaches can be implemented in various environments in accordance with the described embodiments. For example, FIG. 8 illustrates an example of an environment 800 for implementing aspects in accordance with various embodiments, such as to obtain content to be rendered by a 3D or VR headset, or other such device or display. As will be appreciated, although a Web-based environment is used for purposes of explanation, different environments may be used, as appropriate, to implement various embodiments. The system includes an electronic client device 802, which can include any appropriate device operable to send and receive requests, messages or information over an appropriate network 804 and convey information back to a user of the device. This can include, for example, image information captured for the face of a user or a request for virtual reality content to be rendered on a virtual reality headset or other such device. Examples of client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 806 for receiving requests and serving content in response thereto, although for other networks an alternative device serving a similar purpose could be used, as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 802 and the application server 808, can be handled by the Web server 806. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing production data 812 and user information 816, which can be used to serve content for the production side. The data store also is shown to include a mechanism for storing log or session data 814. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 802. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

Various aspects can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and other non-transitory computer readable media for containing code, or portions of code, can include any appropriate media known or used in the art, including storage media and communication media, such as but not limited to volatile and non-volatile, removable and non-removable media implemented in any method or technology for storage of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method for assigning a label to an image comprising:
    obtaining a collection of images;
    determining first feature vectors for individual images in the collection of images;
    analyzing the first feature vectors to generate second feature vectors for the individual images, wherein the second feature vectors have a lower dimensionality than the first feature vectors;
    executing a mode seeking algorithm using the second feature vectors to identify a group of images having a lower image quality compared to images of the collection of images, the group of images having a feature space density greater than a density threshold;
    generating a filtered collection of images by removing the group of images having the lower image quality from the collection of images;
    performing a cluster analysis algorithm on the filtered collection of images to generate one or more identified clusters;
    assigning a label to the images of a cluster of the one or more identified clusters;
    obtaining a query image from a client device;
    determining that the query image belongs to the cluster of the one or more identified clusters; and
    sending the label to the client device.

2. The computer-implemented method of claim 1, further comprising:
    identifying a second group of images of the collection of images having a feature space density greater than the density threshold, wherein the filtered collection of images is further generated by removing the second group of images from the collection of images.

3. The computer-implemented method of claim 1, wherein the cluster analysis algorithm employs a Hierarchical Density Based Spatial Clustering of Applications with Noise (HDBSCAN) algorithm.

4. A computer-implemented method for determining clusters in a dataset, comprising:
    obtaining a collection of content items;
    determining respective item features for individual content items of the collection of content items;
    determining a density metric for a subset of content items of the collection of content items based at least in part upon the respective item features;
    determining that the density metric for the subset of content items is greater than a density threshold;
    generating a filtered collection of content items by removing the subset of content items having the density metric greater than the density threshold from the collection of content items;
    performing a clustering analysis on the filtered collection of content items to generate one or more identified clusters; and
    assigning a label to a cluster of the one or more identified clusters.

5. The computer-implemented method of claim 4, wherein determining the respective item features comprises:
    obtaining a respective set of characteristics for each item of the collection of content items; and
    determining a feature of respective item features for a first content item using a large-margin nearest neighbor classifier based at least upon the respective set of characteristics for each item of the collection of content items.

6. The computer-implemented method of claim 4, wherein determining the density metric comprises:
    applying a mean-shift algorithm to the collection of content items; and
    determining that the quantity of items of the subset of content items that reside within a window of the mean-shift algorithm is above a quantity threshold.

7. The computer-implemented method of claim 4, further comprising:
    determining a second subset of content items having a second density metric that is greater than the density threshold, wherein the filtered collection of content items is further generated by removing the second subset of content items from the collection of content items.

8. The computer-implemented method of claim 4, further comprising:
    determining a second subset of content items having a sparsity metric that is greater than a sparsity threshold, wherein the filtered collection of content items is further generated by removing the second subset of content items from the collection of content items.

9. The computer-implemented method of claim 4, wherein the cluster analysis employs a Hierarchical Density Based Spatial Clustering of Applications with Noise (HDBSCAN) algorithm.

10. The computer-implemented method of claim 4, further comprising:
    obtaining an additional content item;
    determining that the additional content item is dissimilar to the subset of content items; and
    including the additional content item with the filtered collection of content items.

11. The computer-implemented method of claim 4, further comprising:
    presenting a representation of one of the content items of the cluster of content items; and
    receiving the label as an input.

12. The computer-implemented method of claim 4, further comprising:
    obtaining an additional content item;
    determining that a similarity score of the additional content item to the cluster of content items is greater than a predetermined amount; and assigning the label to the additional content item.

13. The computer-implemented method of claim 4, wherein the content items include images, instances of image data, frames of video content, or audio.

14. A system, comprising:
at least one processor; and
memory including instructions that, when executed by the at least one processor, cause the system to:
obtain a collection of content items;
determine respective item features for individual content items of the collection of content items;
determine a density metric for a subset of content items of the collection of content items based at least in part upon the respective item features;
determine that the density metric for the subset of content items is greater than a density threshold;
generate a filtered collection of content items by removing the subset of content items having the density metric greater than the density threshold from the collection of content items;
perform a clustering analysis on the filtered collection of content items to generate one or more identified clusters; and
assign a label to a cluster of the one or more identified clusters.

15. The system of claim 14, wherein the instructions that when executed cause the system to determine the respective item feature further cause the system to:
obtain a respective set of characteristics for each item of the collection of content items; and
determine a feature of respective item features for a first content item using a large-margin nearest neighbor classifier based at least upon the respective set of characteristics for each item of the collection of content items.

16. The system of claim 14, wherein the instructions that when executed cause the system to determine the density metric further cause the system to:
apply a mean-shift algorithm to the collection of content items; and
determine that the quantity of items of the subset of content items that reside within a window of the mean-shift algorithm is above a quantity threshold.

17. The system of claim 14, wherein the instructions when executed further cause the system to:
determine a second subset of content items having a second density metric that is greater than the density threshold, wherein the filtered collection of content items is further generated by removing the second subset of content items from the collection of content items.

18. The system of claim 14, wherein the instructions when executed further cause the system to:
determine a second subset of content items having a sparsity metric that is greater than a sparsity threshold, wherein the filtered collection of content items is further generated by removing the second subset of content items from the collection of content items.

19. The system of claim 14, wherein the cluster analysis employs a Hierarchical Density Based Spatial Clustering of Applications with Noise (HDBSCAN) algorithm.

20. The system of claim 14, wherein the instructions when executed further cause the system to:
obtain an additional content item;
determine that the additional content item is dissimilar to the subset of content items; and
include the additional content item with the filtered collection of content items.

\* \* \* \* \*